Dec. 8, 1970  CHEN-KUO CHANG  3,546,509
FLEXIBLE COMMUTATOR BUSHING
Filed Oct. 30, 1968

WITNESSES:
Leon M. Garman
James F. Young

INVENTOR
Chen-Kuo Chang
BY E. Strickland
ATTORNEY

United States Patent Office 3,546,509
Patented Dec. 8, 1970

3,546,509
FLEXIBLE COMMUTATOR BUSHING
Chen-Kuo Chang, Cheektowaga, N.Y., assignor to Westinghouse Electric Corporation, Pittsburgh, Pa., a corporation of Pennsylvania
Filed Oct. 30, 1968, Ser. No. 771,708
Int. Cl. H01r 39/04; H02k 13/04
U.S. Cl. 310—236                                6 Claims

ABSTRACT OF THE DISCLOSURE

A flexible drum bushing for a commutator in a dynamoelectric machine, the flexible characteristic being provided by elongated, resilient rib portions supporting the bushing at axially and circumferentially spaced apart locations on the rotatable shaft of the machine.

BACKGROUND OF THE INVENTION

Figure 1:
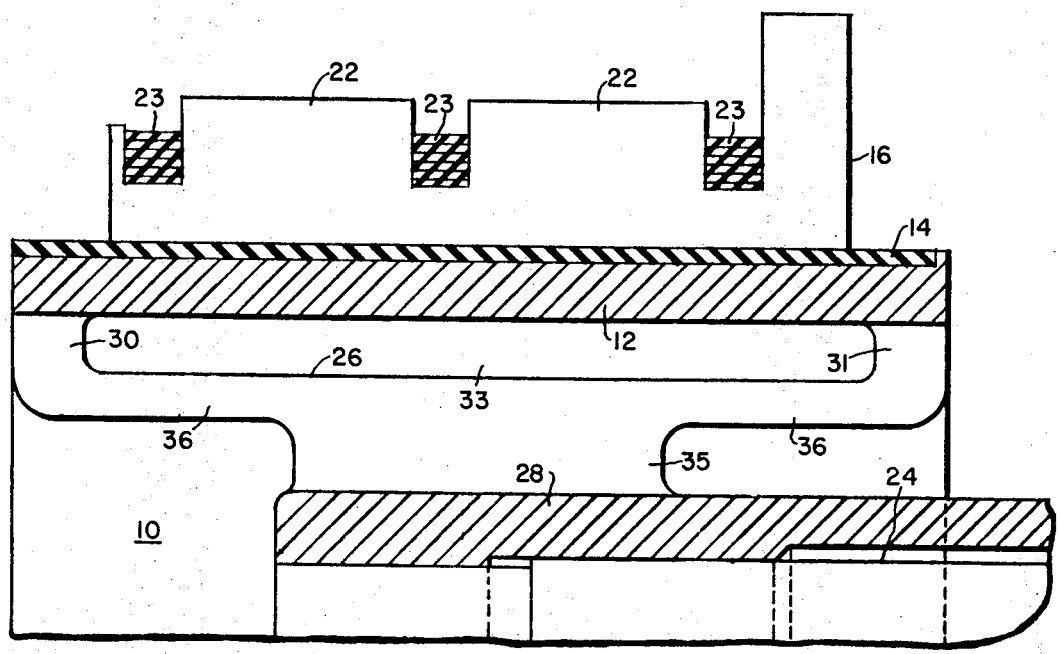

The invention relates generally to drum bound commutators, and particularly to drum bound commutators having a flexible characteristic which maintains an even, round bushing and commutator surface at all speeds of rotation.

In certain type commutator assemblies, commutator bars or segments are bound on the outer surface of a hollow cylindrical shaped drum or bushing by clamping bands of suitable material, the drum or bushing, in turn, being supported on a centrally disposed shaft by radially and axially extending rib portions circumferentially spaced around the shaft. With rotation of the assembly the commutator bars remain in contact with the outer surface of the bushing, and conform thereto for all rotational speeds by virtue of the radially inwardly directed force provided by the clamping bands.

Heretofore, the rib portions have been solid, rigid structures which provided rigid connections with the bushing along the entire axial length of each of the rib portions. With rotation of the assembly, the clamping force acting on the bushing through the bars is substantially reduced from that at standstill because of the centrifugal forces produced in a radially outward direction. The reduced force acting on the bushing in the areas between the ribs tended to force the bushing and thus the commutating surface, in a radially outward direction while the portions of bushing at the rib connections remained radially fixed because of the rigid rib construction. In this manner, the bushing and commutating surface became distorted with high and low spots which resulted in sparking and unsatisfactory commutation.

BRIEF SUMMARY OF THE INVENTION

Thus, what is needed in the type of drum bound commutator described above is a drum bushing that will remain round at all speeds of rotation.

The present invention provides such a bushing with the use of radially and axially extending resilient rib elements which connect and support the bushing in a flexible manner on a centrally located drive shaft. When the shaft and the commutator assembly are rotated, the portions of bushing at the ribs are allowed to move in an outward direction with the portions of the bushing intermediate of the ribs by virtue of ribs' resilient, flexible characteristic. In this manner, high spots between the ribs, and low spots at the ribs are substantially reduced so that the commutator runs smoothly at all speeds of rotation.

THE DRAWING

Figure 2:
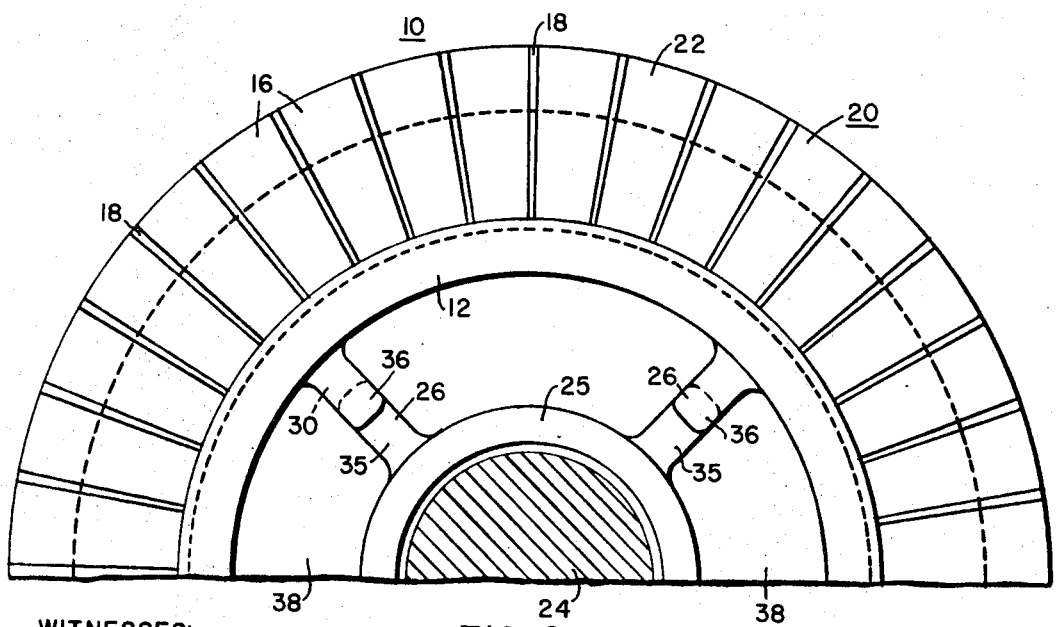

The invention, with its objectives and advantages will become more apparent from reading the following detailed description in connection with the accompanying drawing, in which:

FIG. 1 is a partial side elevation view of a drum bound commutator showing a resilient rib construction of the present invention; and FIG. 2 is a partial end view of the bushing of FIG. 1.

PREFERRED EMBODIMENT

Specifically, FIG. 1 shows a partial side view of a drum bound commutator assembly 10 comprising a drum bushing 12 (in section) supporting an insulating layer of material 14 and a cylindrical array (FIG. 2) of commutator segments or bars 16, only one of which is shown in FIG. 1. The bars 16 are separated from each other by insulating means 18 in a wellknown manner, the array of bars and insulation forming a commutator 20 and a commutating surface 22 on which machine brushes (not shown) ride in the well-known manner. The bars are bound to the drum bushing by clamping bands or rings 23 which may be made from an impregnated parallel fiber unwoven glass tape, for example. The tape is usually wound in layers and under tension to effect a clamping action which fixes the segments and insulation on the bushing.

In accordance with the invention, the drum bushing 12 is supported on a rotatable shaft 24 by resilient rib structures 26 extending radially and axially between said bushing and an inner concentric bushing 28 (shown in section in FIG. 1) adapted to fit on the shaft and to be suitably keyed thereto. The ribs are formed to have two radially extending portions 30 and 31 rigidly joined to the inner surface of the bushing 12, said portions forming an open space 33 therebetween and beneath the drum bushing as viewed in FIG. 1.

The ribs 26 are further formed to have a radially and axially extending portion 35 rigidly joined to the inner bushing 28.

The rib portions 30 and 31 are physically and flexibly joined to the rib portion 35 by elongated resilient portions 36 extending between said portions and axially of the bushing 12 and 28 as best seen in FIG. 1.

As shown in the partial view of FIG. 2, the resilient ribs 26 are circumferentially spaced apart in a manner which requires four ribs to support the bushing 12, only two of which are depicted. Thus, four open areas 38 exist between the ribs 26 and the inner and drum bushings. More or less than four resilient ribs may be used.

In operation, when the shaft 24 and thus the commutator 20 are rotated, the force acting on the drum bushing 12 is reduced, causing the bushing and the segments to expand in a radially outward direction. The portions of the bushing circumferentially intermediate the ribs 26 tend to bow or deflect outwardly since they are removed from the attaching locations of the ribs. The expansion or deflection is in the order of a few thousands of an inch. However, in the present invention, the portions of the drum bushing at the locations of the ribs also move in an outward direction with said intermediate portions because of the flexible characteristic of the ribs provided by the resilient portions 36. In this manner, the portions of the commutator 20 and bushing 12 at the ribs and intermediate of the ribs move in and out in substantially equal amounts thereby maintaining a relatively round and smooth commutating surface 22.

As explained earlier, the rib structures of prior art drum bushings were solid, rigid structures. For this reason, the portions of the bushing intermediate of the ribs bowed in an outward direction while the portions of the bushing at the ribs remained radially fixed. As can be readily appreciated, high and low spots on the commutating surface 22 occurred with the consequent results of excessive brush bouncing and sparking.

In the present invention, the drum bushing and commutating surface remains substantially round, and this is accomplished in a simple and economical manner. The structure comprising the drum and inner bushings 12 and 28, and the connecting, resilient ribs 26 can be economically cast to form an integral, unitary structure providing the advantageous, flexible characteristics described above.

Though the invention has been described with a certain degree of particularity changes may be made therein without departing from the scope and spirit thereof. For example, the invention is not limited to commutator assemblies, but may be applied to other means where a round, flexible bushing is required.

What is claimed is:
1. In a drum bound commutator,
   a drum bushing having an outer surface for supporting commutator bars in a cylindrical array,
   means for supporting said bushing on a drive shaft for rotation about the axis thereof, said means comprising
   an inner bushing concentric with said drum bushing and adapted to engage said drive shaft,
   rib structures joining said inner bushing to said drum bushing in a circumferentially spaced apart manner about said inner bushing, said rib structures extending radially between and axially of said bushings, and
   each of said rib structures having an axially extending resilient portion between said bushings.
2. The commutator described in claim 1 in which the rib structures have
   spaced apart portions which engage the inner surface of the drum bushing at axially spaced apart locations,
   a center portion adapted to engage the inner bushing, and
   the axially extending resilient portions joining said spaced apart portions to said center portion,
   said resilient portions allowing the drum bushing to move in a radially outward direction at the locations of rib engagement when the commutator undergoes high speed rotation, the movement being substantially equal to the movement of those portions of the bushing located circumferentially intermediate of the locations of rib engagement.
3. The commutator described in claim 1 in which the bushings and rib structures are a cast, unitary structure.
4. A commutator comprising a plurality of commutator segments and insulating spacers between said segments supported in a cylindrical array on a suporting bushing,
   means for supporting said bushing on a drive shaft for rotation about the axis thereof, said means comprising
   an inner bushing concentric with said supporting bushing and adapted to engage said drive shaft,
   rib structures joining said inner bushing to said supporting bushing in a circumferentially spaced apart manner about said inner bushing, said rib structures extending radially between and axially of said bushings, and
   each of said rib structures having an axially extending resilient portion between said bushings.
5. The commutator described in claim 4 in which the rib structures have
   spaced apart portions which engage the inner surface of the supporting bushing at axially spaced apart locations,
   a center portion adapted to engage the inner bushing, and
   the axially extending resilient portions joining said spaced apart portions to said center portion,
   said resilient portions allowing the supporting bushing to move in a radially outward direction at the locations of rib engagement when the commutator undergoes high speed rotation, the movement being substantially equal to the movement of those portions of the bushing located circumferentially intermediate of the locations of rib engagement.
6. The commutator described in claim 4 in which the bushings and rib structures are a cast, unitary structure.

References Cited

UNITED STATES PATENTS 3,146,364   8/1964   Paul _____ 310—236

MILTON O. HIRSHFIELD, Primary Examiner

L. L. SMITH, Assistant Examiner